US006975620B2

(12) United States Patent
Corvino et al.

(10) Patent No.: US 6,975,620 B2
(45) Date of Patent: Dec. 13, 2005

(54) COUPLING OF SPLITTER WITH SUBSET OF PLURALITY OF LINES ON ONE-TO-ONE BASIS

(75) Inventors: Phillip Thomas Corvino, St. Charles, IL (US); Ronald Alex Nordin, Naperville, IL (US); David Alan Roberson, Chicago, IL (US); Paul Raymond Sand, Woodridge, IL (US); Cynthia Melanie Stach, Lemont, IL (US); Claudis L. Young, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 836 days.

(21) Appl. No.: 09/776,322

(22) Filed: Feb. 2, 2001

(65) Prior Publication Data

US 2002/0105941 A1  Aug. 8, 2002

(51) Int. Cl.[7] ............................................. H04L 12/66
(52) U.S. Cl. ..................................... 370/352; 370/463
(58) Field of Search ............................... 370/352, 465, 370/488, 493, 290, 291; 379/372, 93.08, 379/93.09, 93.07; 375/220–222

(56) References Cited

U.S. PATENT DOCUMENTS

| | | | |
|---|---|---|---|
| 5,408,260 A | | 4/1995 | Arnon |
| 5,534,912 A | | 7/1996 | Kostreski |
| 5,974,139 A | * | 10/1999 | McNamara et al. ... 379/413.04 |
| 5,991,311 A | * | 11/1999 | Long et al. ................. 370/524 |
| 6,393,110 B1 | * | 5/2002 | Price ........................ 379/93.01 |
| 6,438,226 B1 | * | 8/2002 | Guenther et al. ....... 379/413.04 |
| 6,449,362 B1 | * | 9/2002 | Tennyson et al. ...... 379/413.02 |
| 6,453,033 B1 | * | 9/2002 | Little et al. ................. 379/219 |
| 6,470,074 B2 | * | 10/2002 | Teixeria ................... 379/32.04 |
| 6,574,309 B1 | * | 6/2003 | Chea et al. ..................... 379/9 |
| 6,584,148 B1 | * | 6/2003 | Zitting et al. ............... 375/222 |
| 6,608,842 B2 | * | 8/2003 | Michaels .................... 370/493 |
| 6,728,367 B1 | * | 4/2004 | Swam ........................ 379/372 |
| 6,738,470 B1 | * | 5/2004 | Aronovitz .............. 379/220.01 |
| 6,744,883 B1 | * | 6/2004 | Bingel et al. .......... 379/399.01 |

OTHER PUBLICATIONS

Cook, John; Sheppard, Phil; *ADSL and VADSL Splitter Design and Telephony Performance*; IEEE Journal on Selected Areas in Communications; Dec. 13, 1995, No. 9; New York, NY; pp. 1634-1642.

"10base1; bundled T1/E1 module; E1; E1 (CEPT T1);" http://www.worldcom.com/cgi-bin/search?placetosearch=term&searchfilter=contains&searchstring=e1&pagenum=0&page=1; Worldcom, Clinton, MS; Dec. 12, 2000.

"E3;" http://www.worldcom.com/cgi-bin/search?placetosearch=term&searchfilter=contains&searchstring=e3&pagenum=0&page=1; Worldcom, Clinton, MS; Dec. 12, 2000.

"Enhanced DS1 Test Access Unit (eDTAU);" http://www.worldcom.com/cgi-bin/search?placetosearch=term&searchfilter=contains&searchstring=ds1&pagenum=0&page=1; Worldcom, Clinton, MS; Dec. 12, 2000.

"Simply ADSL;" http://msnhomepages.talkcity.com/ReportersAlley/redbox99/2adsl.htm; Microsoft Corp., Redmond, WA; Dec. 8, 1999.

"Class 5 Switch;" http://www.techweb.com/encyclopedia/defineterm?term=class+5+switch; pp. 1-3; CMP Media, Inc., Manhasset, NY;Nov. 16, 2000.

(Continued)

*Primary Examiner*—John Pezzlo
*Assistant Examiner*—Saba Tsegaye

(57) ABSTRACT

A splitter of a system is locatable at a central office that comprises a plurality of lines. The splitter is configured to be connectable with a subset of the plurality of lines on a one-to-one basis between the splitter and the subset of the plurality of lines.

23 Claims, 3 Drawing Sheets

OTHER PUBLICATIONS

"ATM, Asynchronous Transfer Mode;" http://www.techweb.com/encyclopedia/defineterm?term=atm; pp. 1-9; CMP Media, Inc., Manhasset, NY;Nov. 14, 2000.

"PSTN, Public S witched Telephone Network;" http://www.techweb.com/encyclopedia/defineterm?term=pstn; pp. 1-2; CMP Media, Inc., Manhasset, NY;Nov. 9, 2000.

"POTS Splitter;" http://www.techweb.com/encyclopedia/defineterm?term=POTSSPLITTER&exact=1; pp. 1-2; CMP Media, Inc., Manhassett, NY;Nov. 9, 2000.

"Central Office;" http://www.techweb.com/encyclopedia/defineterm?term=central+office; pp. 1-4; CMP Media, Inc., Manhasset, NY;Nov. 10, 2000.

"POTS, Plain Old Telephone Service", http://www.worldcom.com/tools-resources/communications_library/search?placetosearch+term&searchfilter+is&searchstring=plain+old+telephone+service+%; pp. 1-2; Worldcom, Clinton, MS; Nov. 9, 2000.

"DSLAM, DSL Access Multiplexor," http://www.techweb.com/encyclopedia/defineterm?term=DSLAM&exact=1; CMP Media, Inc., Manhasset, NY;Nov. 14, 2000.

"MDF, Main Distribution Frame,"http://www.techweb.com/encyclopedia/defineterm?term=MDF; CMP Media, Inc., Manhasset, NY;Nov. 9, 2000.

"DSL, Digital Subscriber Line," http://www.techweb.com/encyclopedia/defineterm?term=DSL; pp. 1-5; CMP Media, Inc., Manhasset, NY; Nov. 9, 2000.

"LAN, Local Area Network", http://www.techweb.com/encyclopedia/defineterm?term=lan; pp. 1-7; CMP Media, Inc., Manhasset, NY; Nov. 14, 2000.

"WAN, Wide Area Network;" http://www.techweb.com/encyclopedia/defineterm?term=wan; pp. 1-3; CMP Media, Inc., Manhasset, NY; Nov. 14, 2000.

* cited by examiner

FIG. 2

COUPLING OF SPLITTER WITH SUBSET OF PLURALITY OF LINES ON ONE-TO-ONE BASIS

CROSS-REFERENCE TO RELATED APPLICATIONS

This application contains subject matter which is related to the subject matter of the following applications, which are assigned to the same assignee as this application. The below-listed applications are hereby incorporated herein by reference in their entirceties:

"TELECOMMUNICATION EQUIPMENT SUPPORT OF HIGH SPEED DATA SERVICES," by Nye et al., Ser. No. 08/767,138, filed Dec. 19, 1996, now U.S. Pat. No. 6,144,659.

"A DSL-COMPATIIBLE POTS LINE CARD," by Nordin et al., Ser. No. 09/617,446, filed Jul. 17, 2000.

"Direct electrical connectability of port of splitter unit to connector of interface circuit of switch," by Foss et al., Ser. No. 09/776,388, filed concurrently herewith.

TECHNICAL FIELD

The invention in one embodiment relates generally to telecommunications and more particularly to employment of a splitter at a central office for use with a digital subscriber loop/line ("DSL").

BACKGROUND

A splitter in one example comprises a plain old telephone service ("POTS") splitter. A POTS splitter in one example comprises a low-pass filter and a high-pass filter. The low-pass filter in one example serves to direct analog voice signals to a first line. The high-pass filter in one example serves to direct a digital subscriber line ("DSL") signal to a second line. In one example, each line comprises a twisted wire pair.

One implementation employs external splitters. External splitters in one example comprise a separate shelf within a cabinet. As one shortcoming, the separate shelf consumes space within the cabinet. As another shortcoming, the separate shelf requires the telephone company to run lines for all the splitters to provide DSL service to any one or more customers among all the customers served by the splitters of the splitter shelf.

At a central office, in one example, the telephone company runs lines from the main distribution frame to the splitter shelf. In addition, the telephone company runs lines from the splitter shelf to a digital subscriber line access multiplexor ("DSLAM"), for example, to provide asymmetric digital subscriber line ("ADSL") service. Further, the telephone company runs lines from the splitter shelf to a switch, for instance, a Class 5 switch, for example, to provide POTS. The running of all these lines involves a disadvantageously large use of resources, time, and space.

An implementation that had previously employed POTS only, undesirably rewires lines to all splitters of the splitter shelf, even to update only a single line to provide asymmetric digital subscriber line service in addition to the POTS. For example, the implementation requires wiring for a new bay of equipment that services all the splitters of the splitter shelf.

Thus, a need exists for enhanced selectivity in coupling of a splitter with a number of lines. A further need exists for an enhanced basis in coupling of a splitter with a number of lines.

SUMMARY

Pursuant to one embodiment of the invention, shortcomings of the existing art are overcome and additional advantages are provided through the provision of coupling of a splitter with a subset of a plurality of lines on a one-to-one basis.

The invention in one embodiment encompasses a system. The system includes a splitter that is locatable at a central office that comprises a plurality of lines. The splitter is configured to be connectable with a subset of the plurality of lines on a one-to-one basis between the splitter and the subset of the plurality of lines.

Another embodiment of the invention encompasses a method. A splitter that is locatable at a central office that comprises a plurality of lines is selected. The splitter is selected to be configured to be connectable with a subset of the plurality of lines on a one-to-one basis between the splitter and the subset of the plurality of lines.

These and other features and advantages of one embodiment of the invention will become apparent from the following detailed description, the accompanying drawings, and the claims.

BRIEF DESCRIPTION OF THE DRAWINGS

FIG. 2 represents illustrative details of one example of a splitter of the system of FIG. 1.

DETAILED DESCRIPTION

In one embodiment of the invention, a splitter is coupled with a subset of a plurality of lines at a central office on a one-to-one basis between the splitter and the subset of the plurality of lines. A detailed discussion of one exemplary embodiment of the invention is presented herein, for illustrative purposes.

Figure 1:
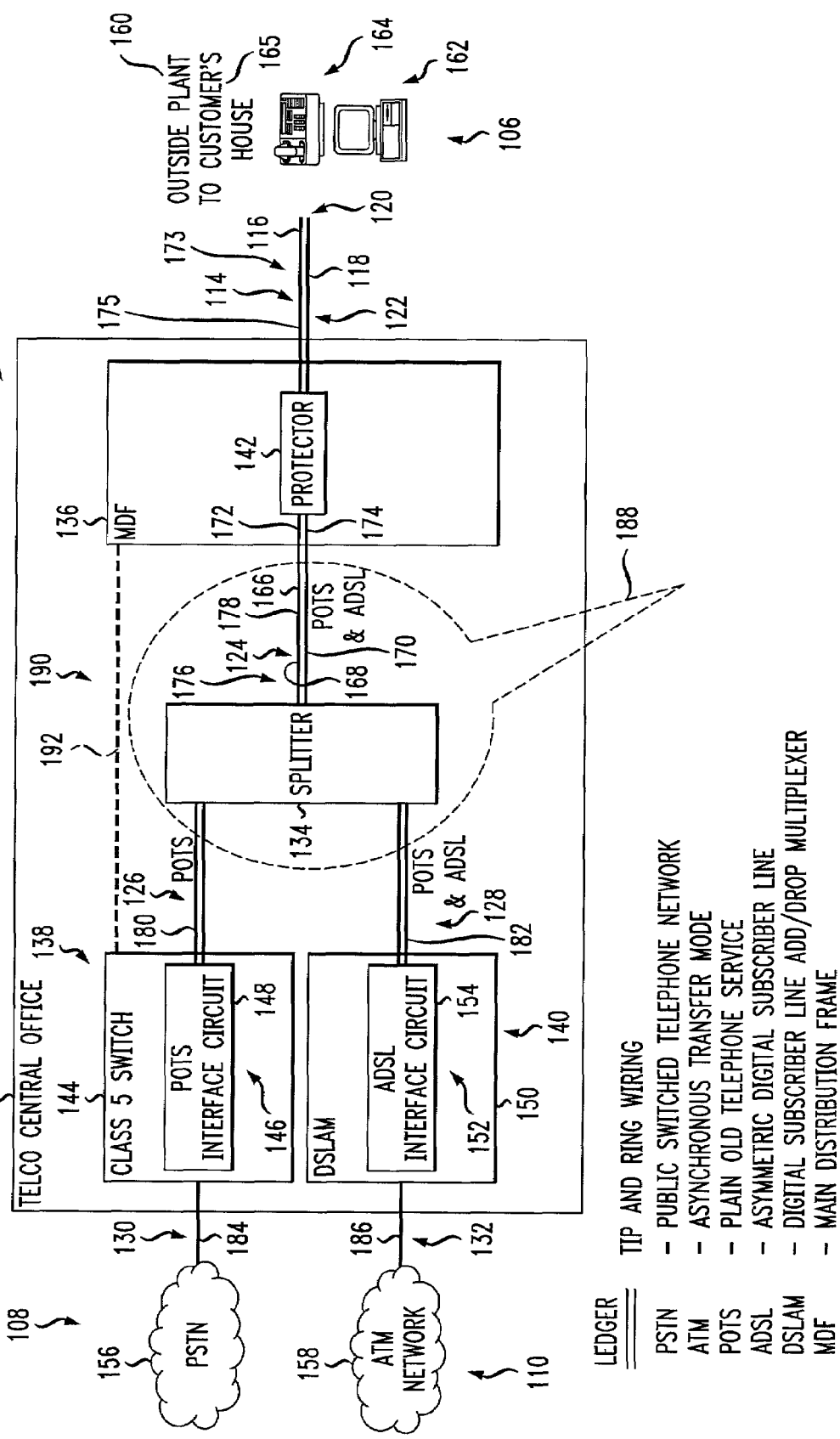
FIG. 1 illustrates one example of a system that includes one or more networks, an outside plant, and a central office that includes one or more splitters, a main distribution frame, and one or more interface circuits.

Turning to FIG. 1, system 100, in one example, includes a plurality of components such as computer hardware components. A number of such components can be combined or divided in one example of system 100.

Referring again to FIG. 1, system 100 in one example comprises one or more components, for example, components 104 and 106, networks 108 and 110, a plurality of instances of line 114, and facilities 130 and 132.

Still referring to FIG. 1, line 114 in one example serves to connect and/or couple one or more components of system 100 with one or more other components of system 100. In one example, line 114 comprises wires 116 and 118. For example, wires 116 and 118 each comprise solid wire such as twenty-two to twenty-six gauge solid wire. Wire 116 in one example comprises a tip ("T") wire. Wire 118 in one example comprises a ring ("R") wire. Wires 116 and 118 in one example comprise twisted wire pair 120, as will be appreciated by those skilled in the art. Exemplary instances of line 114 comprise lines 122, 124, 126, and 128. Exemplary instances of facilities 130 and 132 comprise interoffice facilities, for example, E3, DS3, E1, DS1, STM-1, and OC3, as will be understood by those skilled in the art.

Referring further to FIG. 1, line 122 in one example serves to couple component 104 with component 106.

Facility 130 in one example serves to couple component 104 with network 108. Facility 132 in one example serves to couple component 104 with network 110.

Referring still to FIG. 1, component 104 in one example comprises central office ("CO") 112. Central office 112 in one example comprises a local telephone company switching center and/or a telecommunications central office. For example, central office 112 comprises an end office, for instance, a Class 5 office. In one example, central office 112 connects directly to component 106. In a further example, central office 112 provides customer services such as call waiting and call forwarding. In a still further example, central office 112 performs billing, as will be appreciated by those skilled in the art.

Again referring to FIG. 1, central office 112 in one example comprises splitter 134, main distribution frame ("MDF") 136, switch 138, and multiplexor 140. Line 122 in one example serves to couple component 106 with main distribution frame 136. Line 124 in one example serves to couple main distribution frame 136 with splitter 134. Line 126 in one example serves to couple splitter 134 with switch 138. Line 128 in one example serves to couple splitter 134 with multiplexor 140. Facility 130 in one example serves to couple switch 138 with network 108. Facility 132 in one example serves to couple multiplexor 140 with network 110.

Still referring to FIG. 1, splitter 134 in one example is advantageously compatible with standard and/or known wiring for POTS, and desirably allows an addition of DSL service.

Figure 2:
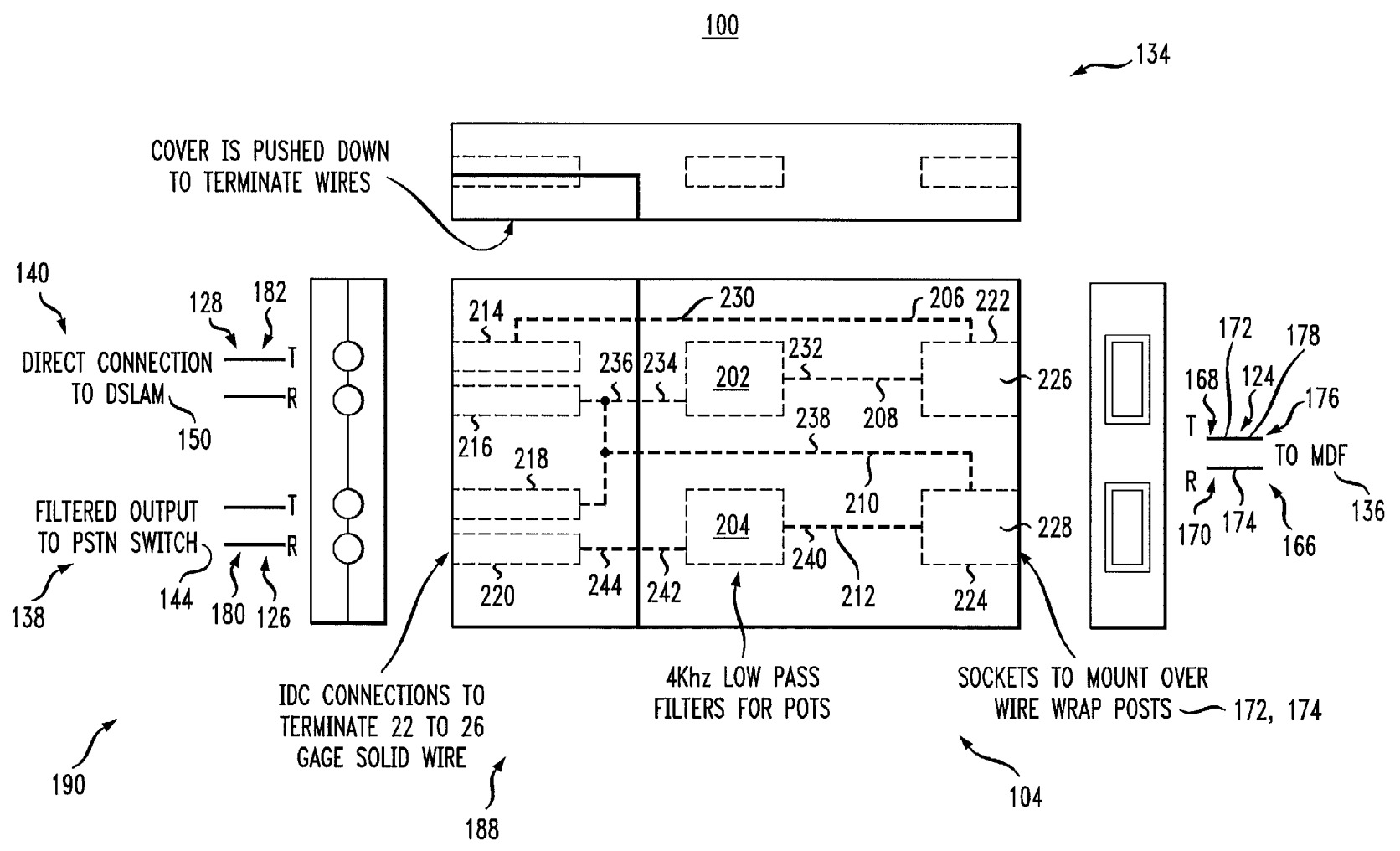

Referring to FIGS. 1–2, splitter 134 and lines 124, 126, and 128 in one example comprise individual unit 188 in central office 112. In one example, lines 124, 126, and 128 comprise subset 190 of a plurality of instances of line 114 of system 100. For example, splitter 134 is connectable with subset 190 of a plurality of instances of line 114 on a one-to-one basis between splitter 134 and subset 190. Splitter 134 in one example is configured to be connectable with subset 190 of a plurality of instances of line 114 on a one-to-one basis between splitter 134 and subset 190. In a further example, an instance of line 114 of subset 190 is advantageously convertible from a POTS line (e.g., line 126) to a POTS and asymmetric digital subscriber line (e.g., line 124) on a basis of individual unit 188 that comprises splitter 134 and subset 190. Desirably, splitter 134 in one example is installable on subset 190 of a plurality of instances of line 114 without interruption of POTS on a particular instance of line 114 (e.g., line 192) that is different from every instance of line 114 of subset 190. Advantageously, splitter 134 in one example is connectable with lines 124, 126, and 128 without employment of a splitter shelf.

Figure 3:
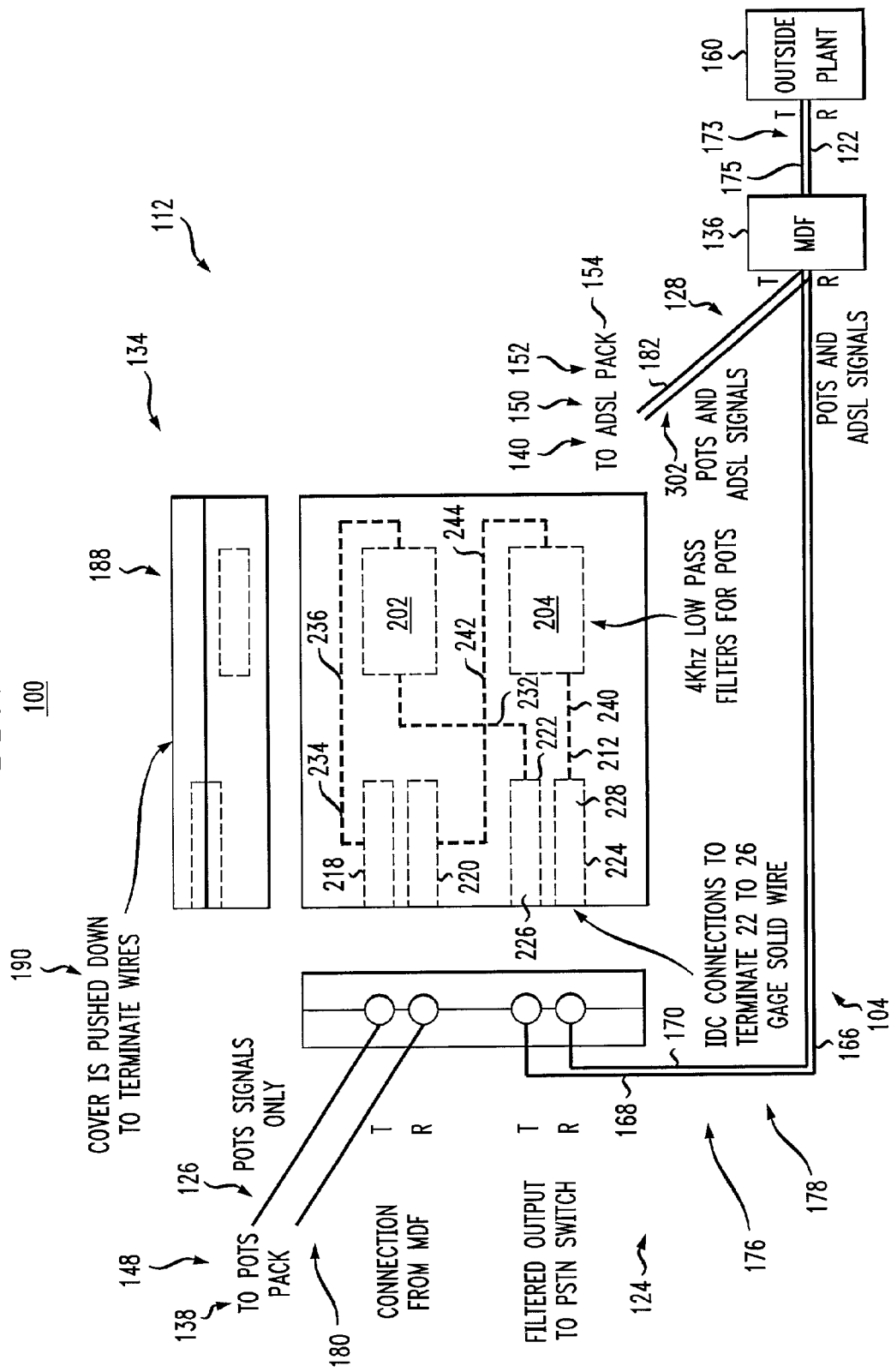
FIG. 3 represents illustrative details of another example of a splitter of the system of FIG. 1.

Referring to FIGS. 1 and 3, splitter 134 and lines 124 and 126 in one example comprise individual unit 188 in central office 112. In one example, lines 124 and 126 comprise subset 190 of a plurality of instances of line 114 of system 100. For example, splitter 134 is connectable with subset 190 of a plurality of instances of line 114 on a one-to-one basis between splitter 134 and subset 190. In a further example, an instance of line 114 of subset 190 is advantageously convertible from a POTS line (e.g., line 126) to a POTS and asymmetric digital subscriber line (e.g., line 124) on a basis of individual unit 188 that comprises splitter 134 and subset 190. Desirably, splitter 134 in one example is installable on subset 190 of a plurality of instances of line 114 without interruption of POTS on a particular instance of line 114 (e.g., line 192) that is different from every instance of line 114 of subset 190. Advantageously, splitter 134 in one example is connectable with lines 124 and 126 without employment of a splitter shelf.

Referring again to FIG. 1, main distribution frame 136 in one example comprises a connecting unit between instances of line 114 that relative to central office 112 are external, and instances of line 114 that relative to central office 112 are internal. For example, main distribution frame 136 comprises a connecting unit between an instance of line 122 that is external relative to central office 112, and an instance of line 124 that is internal relative to central office 112. In one example, main distribution frame 136 comprises protector 142. Protector 142 in one example serves to protect central office 112 from possible damage that otherwise could result, for example, from foreign over-voltage and/or over-current introduced in outside plant 160 on one or more instances of line 114.

Referring still to FIG. 1, switch 138 in one example comprises Class 5 switch 144. For example, switch 138 comprises circuit 146. Circuit 146 in one example comprises POTS interface circuit 148.

Further referring to FIG. 1, multiplexor 140 in one example comprises a digital subscriber line multiplexor, for example, digital subscriber line add/drop multiplexor ("DSLAM") 150. Digital subscriber line add/drop multiplexor 150 in one example comprises circuit 152. Circuit 152 in one example comprises asymmetric digital subscriber line ("ADSL") interface circuit 154.

Again referring to FIG. 1, network 108 in one example comprises public switched telephone network ("PSTN") 156. Public switched telephone network 156 in one example comprises the worldwide voice telephone network, as will be understood by those skilled in the art.

Referring still to FIG. 1, network 110 in one example comprises asynchronous transfer mode ("ATM") network 158. Asynchronous transfer mode network 158 in one example supports realtime voice, video, and data.

Again referring to FIG. 1, component 106 in one example comprises outside plant 160. Outside plant 160 in one example comprises a feeder and distribution system, for example, to a number of instances of home 162 and/or office 164 of one or more instances of customer 165 of central office 112.

Turning to FIG. 2, splitter 134 in one example comprises filters 202 and 204, wires 206, 208, 210, 212, 236, and 244, and connectors 214, 216, 218, 220, 222, and 224. Filters 202 and 204 in one example each comprise a low-pass filter. For example, filters 202 and 204 each comprise a 4 kHz low-pass filter.

Referring again to FIG. 2, wire 230 in one example serves to couple connector 222 with connector 214. Wire 232 in one example serves to couple connector 222 with filter 202. Wire 236 in one example serves to couple filter 202 with connector 218. Wire 210 in one example serves to couple connector 224 with connector 216. Wire 212 in one example serves to couple connector 224 with filter 204. Wire 244 in one example serves to couple filter 204 with connector 220.

Now referring to FIGS. 1–2, line 124 in one example comprises POTS and asymmetric digital subscriber line 166. POTS and asymmetric digital subscriber line 166 in one example comprises wires 168 and 170. Wire 168 in one example comprises a tip wire. Wire 170 in one example comprises a ring wire. In a further example, wire 168 comprises wire wrap terminal 172 of main distribution frame 136. Wire wrap terminal 172 in one example comprises a tip wire wrap terminal. In a still further example, wire 170 comprises wire wrap terminal 174 of main distribution frame 136. Wire wrap terminal 174 in one example comprises a ring wire wrap terminal, as will be appreciated by those skilled in the art.

Referring still to FIGS. 1–2, connectors 214, 216, 218, and 220 in one example comprise respective instances of insulation displacement connectors ("IDC") type terminals. Connectors 222 and 224 in one example comprise sockets 226 and 228, respectively, as will be appreciated by those skilled in the art.

Referring again to FIGS. 1–2, socket 226 in one example comprises a tip socket. In one example, socket 226 is coupled with wire 168. For instance, socket 226 telescopically engages wire wrap terminal 172. For example, socket 226 is mounted on and/or plugged onto wire wrap terminal 172. Socket 228 in one example comprises a ring socket. In one example, connector 224 is coupled with wire 170. For instance, socket 228 telescopically engages wire wrap terminal 174. For example, socket 228 is mounted on and/or plugged onto wire wrap terminal 174.

Referring further to FIGS. 1–2, outside plant 160 in one example sends signal 173 across line 122 to central office 112. For example, outside plant 160 sends signal 173 across line 122 to main distribution frame 136. Signal 173 in one example comprises POTS and asymmetric digital subscriber line signal 175. Main distribution frame 136 in one example employs POTS and asymmetric digital subscriber line signal 175 to obtain signal 176.

Still referring to FIGS. 1–2, main distribution frame 136 in one example sends signal 176 across line 124 to splitter 134. Signal 176 in one example comprises POTS and asymmetric digital subscriber line signal 178. Splitter 134 in one example employs POTS and asymmetric digital subscriber line signal 178 to obtain POTS signal 180 and POTS and asymmetric digital subscriber line signal 182, as described herein.

Again referring to FIGS. 1–2, connector 222 of splitter 134 in one example employs POTS and asymmetric digital subscriber line signal 178 to obtain and send POTS and asymmetric digital subscriber line signal 230 across wire 206 to connector 214. In a further example, connector 222 employs POTS and asymmetric digital subscriber line signal 178 to obtain and send POTS and asymmetric digital subscriber line signal 232 across wire 208 to filter 202. Filter 202 in one example employs POTS and asymmetric digital subscriber line signal 232 to obtain and send POTS signal 234 across wire 236 to connector 218.

Referring further to FIGS. 1–2, connector 224 of splitter 134 in one example employs POTS and asymmetric digital subscriber line signal 178 to obtain and send POTS and asymmetric digital subscriber line signal 238 across wire 210 to connector 216. In a further example, connector 224 employs POTS and asymmetric digital subscriber line signal 178 to obtain and send POTS and asymmetric digital subscriber line signal 240 across wire 212 to filter 204. Filter 204 in one example employs POTS and asymmetric digital subscriber line signal 240 to obtain and send POTS signal 242 across wire 244 to connector 220.

Referring still to FIGS. 1–2, connectors 218 and 220 of splitter 134 in one example employ signals 234 and 242 to obtain and send POTS signal 180 across line 126 to switch 138. Connectors 214 and 216 in one example employs signals 230 and 238 to obtain and send POTS and asymmetric digital subscriber line signal 182 across line 128 to multiplexor 140.

Further referring to FIGS. 1–2, splitter 134 in one example sends POTS signal 180 across line 126 to POTS interface circuit 148. POTS interface circuit 148 in one example employs POTS signal 180 to obtain and send POTS signal 184 across facility 130 to public switched telephone network 156.

Again referring to FIGS. 1–2, splitter 134 in one example sends POTS and asymmetric digital subscriber line signal 182 across line 128 to asymmetric digital subscriber line interface circuit 154. Asymmetric digital subscriber line interface circuit 154 in one example employs POTS and asymmetric digital subscriber line signal 182 to obtain and send asynchronous transfer mode signal 186 across facility 132 to asynchronous transfer mode network 158.

Turning to FIG. 3, in another example, splitter 134 comprises filters 202 and 204, wires 208, 212, 236, and 244, and connectors 218, 220, 222, and 224. In a further example, line 128 serves to couple main distribution frame 136 with multiplexor 140. For example, line 128 serves to couple main distribution frame 136 with asymmetric digital subscriber line interface circuit 154.

Still referring to FIG. 3, splitter 134 in one example comprises an in-line instance of filter 134. In one example, splitter 134 is located near main distribution frame 136. In another example, splitter 134 is located a distance away from main distribution frame 136. For example, a location of splitter 134 depends on one or more factors such as availability of space.

Again further to FIG. 3, outside plant 160 in one example sends signal 173 across line 122 to central office 112. For example, outside plant 160 sends signal 173 across line 122 to main distribution frame 136. Signal 173 in one example comprises POTS and asymmetric digital subscriber line signal 175. Main distribution frame 136 in one example employs POTS and asymmetric digital subscriber line signal 175 to obtain signals 176 and 302. Signal 176 in one example comprises POTS and asymmetric digital subscriber line signal 178. Signal 302 in one example comprises POTS and asymmetric digital subscriber line signal 182.

Still referring to FIG. 3, main distribution frame 136 in one example sends POTS and asymmetric digital subscriber line signal 178 across line 124 to splitter 134. Splitter 134 in one example employs POTS and asymmetric digital subscriber line signal 178 to obtain POTS signal 180.

Further referring to FIG. 3, in a further example, main distribution frame 136 sends POTS and asymmetric digital subscriber line signal 182 across line 128 to multiplexor 140. For example, main distribution frame 136 sends POTS and asymmetric digital subscriber line signal 182 across line 128 to asymmetric digital subscriber line interface circuit 154. Asymmetric digital subscriber line interface circuit 154 in one example employs POTS and asymmetric digital subscriber line signal 182 to obtain and send asynchronous transfer mode signal 186 across facility 132 (FIG. 1) to asynchronous transfer mode network 158 (FIG. 1).

Again referring to FIG. 3, connector 222 of splitter 134 in one example employs POTS and asymmetric digital subscriber line signal 178 from main distribution frame 136 to obtain and send POTS and asymmetric digital subscriber line signal 232 across wire 208 to filter 202. Filter 202 in one example employs POTS and asymmetric digital subscriber line signal 232 to obtain and send POTS signal 234 across wire 236 to connector 218.

Referring further to FIG. 3, connector 224 of splitter 134 in one example employs POTS and asymmetric digital subscriber line signal 178 to obtain and send POTS and asymmetric digital subscriber line signal 240 across wire 212 to filter 204. Filter 204 in one example employs POTS and asymmetric digital subscriber line signal 240 to obtain and send POTS signal 242 across wire 244 to connector 220.

Referring still to FIG. 3, connectors 218 and 220 of splitter 134 in one example employs signals 234 and 242 to obtain and send POTS signal 180 across line 126 to switch 138. For example, splitter 134 sends POTS signal 180 across line 126 to POTS interface circuit 148. POTS interface circuit 148 in one example employs POTS signal 180 to obtain and send POTS signal 184 (FIG. 1) across facility 130 (FIG. 1) to public switched telephone network 156 (FIG. 1).

The flow diagrams depicted herein are just exemplary. There may be many variations to these diagrams or the steps or operations described therein without departing from the spirit of the invention. For instance, the steps may be performed in a differing order, or steps may be added, deleted, or modified.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A system, comprising:
   a splitter that is locatable at a central office that comprises a plurality of lines;
   wherein the splitter is configured to be connectable with a subset of the plurality of lines on a one-to-one basis between the splitter and the subset of the plurality of lines;
   wherein the central office comprises a main distribution frame and a switch, wherein the main distribution frame is coupled with a first line of the subset of the plurality of lines, wherein the switch is coupled with a second line of the subset of the plurality of lines, wherein the first line is different from the second line;
   wherein the splitter is configured to be connectable with the first line and the second line without employment of a splitter shelf;
   wherein the second line is convertible from a plain old telephone service line to a plain old telephone service and asymmetric digital subscriber line through employment of an individual unit that comprises the splitter and the subset of the plurality of lines;
   wherein the splitter provides a first signal path between the switch and the main distribution frame, wherein the splitter is configured to be installable on the subset of the plurality of lines without interruption of plain old telephone service on a particular line of the plurality of lines, wherein the particular line is different from every line of the subset of the plurality of lines and provides a second signal path that directly connects the switch with the main distribution frame.

2. The system of claim 1, wherein the subset of the plurality of lines comprises the first line, the second line, and a third line, wherein the first line is different from the third line, wherein the second line is different from the third line;
   wherein the first line comprises a plain old telephone service and asymmetric digital subscriber line, wherein the second line comprises a plain old telephone service line, wherein the third line comprises a plain old telephone service and asymmetric digital subscriber line; and
   wherein the splitter is configured to be connectable with the first line, the second line, and the third line as the individual unit in the central office, wherein the individual unit comprises the splitter, the first line, the second line, and the third line.

3. The system of claim 1, wherein the first line comprises a plain old telephone service and asymmetric digital subscriber line, wherein the second line comprises a plain old telephone service line; and
   wherein the splitter is configured to be connectable with the first line and the second line as the individual unit in the central office, wherein the individual unit comprises the splitter, the first line, and the second line.

4. The system of claim 1, wherein the switch comprises a plain old telephone service interface circuit, wherein the central office comprises a digital subscriber line multiplexor, wherein the digital subscriber line multiplexor is coupled with a third line of the subset of the plurality of lines, wherein the first line is different from the third line, wherein the second line is different from the third line; and
   wherein the splitter is configured to be connectable with the first line, the second line, and the third line without employment of a splitter shelf.

5. The system of claim 1, wherein the first line comprises a plait old telephone service and asymmetric digital subscriber line, wherein the second line comprises a plain old telephone service line;
   wherein the splitter comprises a low-pass filter, and wherein plain old telephone service is obtainable through connection of the low-pass filter with the first line and the second line.

6. The system of claim 1, wherein the main distribution frame comprises a plurality of wire wrap terminals; and
   wherein the splitter is configured to be mountable on a pair of wire wrap terminals of the plurality of wire wrap terminals.

7. The system of claim 1, wherein the central office comprises a local telephone company switching center.

8. The system of claim 1, in combination with the main distribution frame, wherein the main distribution frame comprises a protector that is electrically connected with the first line, wherein the first line comprises a connector that is electrically connected with a connector of the splitter;
   wherein the protector shields the central office from potential over-voltage and/or over-current received from an outside plant.

9. The system of claim 1, wherein the splitter is configured to be connectable with the first line and the second line without employment of the splitter shelf to promote an increase in an amount of available space in a rack of the central office.

10. The system of claim 1, wherein the individual unit comprises a module installable on the second line to convert the second line from the plain old telephone service line to the plain old telephone service and asymmetric digital subscriber line.

11. A method, comprising the steps of:
    selecting a splitter that is locatable at a central office that comprises a plurality of lines;
    selecting the splitter to be configured to be connectable with a subset of the plurality of lines on a one-to-one basis between the splitter and the subset of the plurality of lines;
    wherein the ventral office comprises a main distribution frame and a switch, wherein the main distribution frame is coupled with a first line of the subset of the plurality of lines, wherein the switch is coupled with a second line of the subset of the plurality of lines, wherein the first line is different from the second line;

selecting the splitter to be configured to be connectable with the first line and the second line without employment of a splitter shelf; and converting the second line of the subset of the plurality of lines from a plain old telephone service line to a plain old telephone service and asymmetric digital subscriber line through employment of an individual unit that comprises the splitter and the subset of the plurality of lines;

wherein the splitter provides a first signal path between the switch and the main distribution frame, wherein the splitter is configured to be installable on the subset of the plurality of lines without interruption of plain old telephone service on a particular line of the plurality of lines, wherein the particular line is different from every line of the subset of the plurality of lines and provides a second signal path that directly connects the switch with the main distribution frame.

12. The method of claim 11, wherein the subset of the plurality of lines comprises the first live, the second line, and a third line, wherein the first line is different from the third line, wherein the second line is different from the third line, wherein the step of selecting the splitter that is locatable at the central office that comprises the plurality of lines and the step of selecting the splitter to be configured to be connectable with the subset of the plurality of lines on the one-to-one basis between the splitter and the subset of the plurality of lines comprise the steps of:

selecting the first line to comprise a plain old telephone service and asymmetric digital subscriber line;

selecting the second line to comprise a plain old telephone service line;

selecting the third line to comprise a plain old telephone service and asymmetric digital subscriber line; and selecting the splitter to be configured to be connectable with the first line, the second line, and the third line as the individual unit in the central office, wherein the individual unit comprises the splitter, the first line, the second line, and the third line.

13. The method of claim 11, wherein the step of selecting the splitter that is locatable at the central office that comprises the plurality of lines and the step of selecting the splitter to be configured to be connectable with the subset of the plurality of lines on the one-to-one basis between the splitter and the subset of the plurality of lines comprise the steps of:

selecting the first line to comprise a plain old telephone service and asymmetric digital subscriber line;

selecting the second line to comprise a plain old telephone service line; and selecting the splitter to be configured to be connectable with the first line and the second line as the individual unit in the central office, wherein the individual unit comprises the splitter, the first line, and the second line.

14. The method of claim 11, wherein the switch comprises a plain old telephone service interface circuit, wherein the central office comprises a digital subscriber line multiplexor, wherein the digital subscriber line multiplexor is coupled with a third line of the subset of the plurality of lines, wherein the first line is different from the third line, wherein the second line is different from the third line, and wherein the step of selecting the splitter to be configured to be connectable with the first line and the second line with out employment of the splitter shelf comprises the step of:

selecting the splitter to be configured to be connectable with the first line, the second line, and the third line without employment of a splitter shelf.

15. The method of claim 11, wherein the first line comprises a plain old telephone service and asymmetric digital subscriber line, wherein the second line comprises a plain old telephone service line, wherein the step of selecting the splitter that is locatable at the central office that comprises the plurality of lines and the step of selecting the splitter to be configured to be connectable with the subset of the plurality of lines on the one-to-one basis between the splitter and the subset of the plurality of lines comprise the steps of:

selecting the splitter to comprise a low-pass filter; and obtaining plain old telephone service through connection of the low-pass filter with the first line and the second line.

16. The method of claim 11, wherein the main distribution frame comprises a plurality of wire wrap terminals, and wherein the step of selecting the splitter that is locatable at the central office that comprises the plurality of lines and the step of selecting the splitter to be configured to be connectable with the subset of the plurality of lines on the one-to-one basis between the splitter and the subset of the plurality of lines comprise the step of:

selecting the splitter to be configured to be mountable on a pair of wire wrap terminals of the plurality of wire wrap terminals.

17. The method of claim 11, wherein the step of selecting the splitter that is locatable at the central office that comprises the plurality of lines comprises the step of:

selecting the central office to comprise a local telephone company switching center.

18. The system of claim 1, wherein the splitter employs a first mixed plain old telephone service and asymmetric digital subscriber line signal to obtain a plain old telephone service signal and a second mixed plain old telephone service and asymmetric digital subscriber line signal.

19. The system of claim 18, wherein the switch comprises a plain old telephone service interface circuit, wherein the central office comprises a digital subscriber line multiplexor that comprises an asymmetric digital subscriber line interface circuit;

wherein the splitter sends the plain old telephone service signal to the plain old telephone service interface circuit, wherein the splitter sends the second mixed plain old telephone service and asymmetric digital subscriber line signal to the asymmetric digital subscriber line interface circuit.

20. The method of claim 11, further comprising the step of:

inputting a first mixed plain old telephone service and asymmetric digital subscriber line signal to the to output a plain old telephone service signal and a second mixed plain old telephone service and asymmetric digital subscriber line signal.

21. The method of claim 20, wherein the switch comprises a plain old telephone service interface circuit, wherein the central office comprises a digital subscriber line multiplexor that comprises an asymmetric digital subscriber line interface circuit, the method further comprising the steps of:

employing the splitter to send the plain old telephone service signal to the plain old telephone service interface circuit; and employing the splitter to send the second mixed plain old telephone service and asymmetric digital subscriber line signal to the asymmetric digital subscriber line interface circuit.

22. The method of claim 11, wherein the first line comprises a connector that is electrically connected with a connector of the splitter, wherein the main distribution frame comprise a protector, the method further comprising the step of:
 electrically connecting the first line with the protector to shield the central office from potential over-voltage and/or over-current received from an outside plant.

23. The method of claim 11, wherein the step of selecting the splitter to be configured to be connectable with the first line and the second line without employment of the splitter shelf comprises the step of:
 promoting an increase in an amount of available space in a rack of the central office through connection of the splitter with the first line and the second line without employment of a splitter shelf.

* * * * *